United States Patent
Dillon

(10) Patent No.: US 12,101,708 B2
(45) Date of Patent: Sep. 24, 2024

(54) MOBILITY MULTI-TRANSPORT SOFTWARE DEFINED WIDE AREA NETWORK

(71) Applicant: Douglas Dillon, Rockville, MD (US)

(72) Inventor: Douglas Dillon, Rockville, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 412 days.

(21) Appl. No.: 17/645,969

(22) Filed: Dec. 24, 2021

(65) Prior Publication Data
US 2022/0386215 A1 Dec. 1, 2022

Related U.S. Application Data

(60) Provisional application No. 63/194,763, filed on May 28, 2021.

(51) Int. Cl.
H04W 40/04 (2009.01)
H04B 7/185 (2006.01)
H04L 45/24 (2022.01)

(52) U.S. Cl.
CPC ........ *H04W 40/04* (2013.01); *H04B 7/18584* (2013.01); *H04L 45/245* (2013.01)

(58) Field of Classification Search
None
See application file for complete search history.

(56) References Cited

U.S. PATENT DOCUMENTS

| | | | |
|---|---|---|---|
| 7,398,552 B2 | 7/2008 | Pardee et al. | |
| 9,240,950 B2 | 1/2016 | Vedula et al. | |
| 9,634,945 B2 | 4/2017 | Stevens et al. | |
| 9,680,500 B2 | 6/2017 | Bhaskar et al. | |
| 9,716,659 B2 | 7/2017 | Dillon | |
| 9,832,131 B2 | 11/2017 | Vedula et al. | |
| 9,832,169 B2 | 11/2017 | Border et al. | |

(Continued)

FOREIGN PATENT DOCUMENTS

| EP | 3248302 A1 | 11/2017 |
|---|---|---|
| EP | 3751803 A1 | 12/2020 |

OTHER PUBLICATIONS

International Search Report for PCT Application No. PCT/US2022/072335.

(Continued)

*Primary Examiner* — Minh Trang T Nguyen

(74) *Attorney, Agent, or Firm* — Capitol City TechLaw; Jasbir Singh

(57) ABSTRACT

A system and method for increasing bandwidth utilization of an aggregated path by a mobile terminal, the method including: establishing the aggregated path of communication with the mobile terminal, where the aggregated path includes a first path including a High Throughput Satellite (HTS) path having a first available capacity and a second path including a wireless path having a second available capacity; tracking the first and second available capacities; and updating, upon a movement of the mobile terminal, the first available capacity based on a distance of the mobile terminal from a satellite beam center of a current satellite beam; and selecting, to communicate a packet, one of the first and seconds path based on the first and the second available capacities.

20 Claims, 3 Drawing Sheets

(56) References Cited

U.S. PATENT DOCUMENTS

| | | |
|---|---|---|
| 10,044,620 B2 | 8/2018 | Dillon |
| 10,178,035 B2 | 1/2019 | Dillon |
| 10,277,716 B2 | 4/2019 | Bhaskar et al. |
| 10,567,458 B2 | 2/2020 | Bhaskar et al. |
| 10,637,782 B2 | 4/2020 | Dillon et al. |
| 10,708,194 B2 | 7/2020 | Dillon et al. |
| 2018/0302770 A1* | 10/2018 | Bhaskaran ............ H04W 76/14 |

OTHER PUBLICATIONS

Border et al., "Performance Enhancing Proxies Intended to Mitigate Link-Related Degradations", RFC3135, Jun. 2001.

* cited by examiner

MOBILITY MULTI-TRANSPORT SOFTWARE DEFINED WIDE AREA NETWORK

CROSS-REFERENCE TO RELATED APPLICATIONS AND INCORPORATION BY REFERENCE

The present application claims the benefit under 35 U.S.C. 119(e) of U.S. Provisional Application Ser. No. 63/194,763, filed May 28, 2021, which is incorporated herein by reference in its entirety.

FIELD

A system and method for leveraging a mobile lower latency, lower throughput transport, like a wireless cellular network, in conjunction with mobile high throughput, higher latency spot-beam satellite transport to create a combined transport for an end user. The teachings provide a network that is effectively low latency and high throughput, and has redundancy. In exemplary embodiments, an accelerator, two or more mobile Wide Area Networks (WANs) internet transports including a high latency high throughput satellite transport and a low latency transport, and a peer accelerator at a Point of Presence (PoP) are used by the system and method.

BACKGROUND

High-Thruput Satellite (HTS) networks use spot-beams with frequency reuse to increase the capacity of a given satellite with its limited spectrum constraints. Similarly, ground-based wireless networks use "cells" with frequency reuse to increase the capacity available to the network given its limited spectrum constraints. HTS systems are capable of delivering over 200 Mbps throughput from a ground station to an end user terminal; however, a minimum Round Trip Time (RTT) of at least 480 milliseconds for a geosynchronous satellite leads to high packet latency. Despite the high availability, broad coverage, and high throughput, secure webpage retrieval and other highly interactive traffic responsiveness over satellite tends to suffer compared to lower throughput, lower latency terrestrial systems due to the long RTT over satellite and the number of round-trip connections needed in modern end user applications. With the addition of a tracking antenna, an HTS terminal can be mobile and provide network connectivity to airplanes, cars, trucks, ships, trains, boats, or the like.

Ground-based wireless networks (hereafter referred to as wireless networks), such as those provided by cellular telephony services and air to ground networks, provide connectivity with lower latency but also frequently with lower top-speed and higher cost per GB than an HTS network. There is thus a need to provide simultaneously low-latency connectivity to interactive applications and high-capacity and low-cost per GB bulk transfer connectivity to mobile users.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

A challenge with a mobility situation is tracking the rapidly changing available capacity of the HTS and wireless transports as the terminal switches within beams of the HTS or a capacity varies as the edge of a current beam is encountered. The present teachings track available capacity and thereby facilitate path selection. A track capacity module based on using packet loss as evidence of overdriving a WAN transport is disclosed. The thruput achieved in the presence of packet loss may be used as a measure of the transport's available capacity. Combining the track capacity module with better packet loss recovery results in using more of an available bandwidth and appropriate path selection.

An Agile-Switching Active-Path (ASAP) where a mobile terminal is switching across multiple HTS and low-latency wireless spotbeams and cells is disclosed. In some embodiments, an ASAP is found in Aero or mobility situations. A satellite WAN transport is combined with a low latency wireless transport in mobility situations to increase responsiveness of interactive applications while making use of the lower cost per GB and higher capacity of the satellite transport for bulk transfers.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for increasing bandwidth utilization of an aggregated path by a mobile terminal, the method including: establishing the aggregated path of communication with the mobile terminal, where the aggregated path includes a first path including a High Throughput Satellite (HTS) path having a first available capacity and a second path including a wireless path having a second available capacity; tracking the first and second available capacities; and updating, upon a movement of the mobile terminal, the first available capacity based on a distance of the mobile terminal from a satellite beam center of a current satellite beam; and selecting, to communicate a packet, one of the first and seconds path based on the first and the second available capacities. Other embodiments of this aspect include corresponding computer systems, apparatus, and computer programs recorded on one or more computer storage devices, each configured to perform the actions of the methods.

Implementations may include one or more of the following features.

The method where the updating includes updating the second available capacity based on a second distance of the mobile terminal from a base station of a current wireless signal.

The method includes communicating the packet via the selected path.

The method includes queuing for transportation a packet on a rate-limited priority queue, where the selecting is based on a backlog on the rate-limited priority queue, and the rate-limited priority queue is selected based on a received thruput measured during an interval with an elevated packet loss.

The method includes preferring the first path for bulk transfer traffic and the second path for interactive traffic.

The method includes overriding the preferring, when an available capacity of an unpreferred path is greater than an unpreferred path threshold, and the unpreferred path is different than a preferred path.

The method where an endpoint of the aggregated path is disposed in a mobile platform.

The method where the second path is provided by a wireless terminal, the tracking includes receiving a wireless cell ID from the wireless terminal, and the updating is performed when the wireless cell ID changes.

The method where the wireless terminal provides a wireless available capacity based on a distance of the mobile terminal from a cell center.

The method where the first path is provided by an HTS terminal, the tracking includes receiving a spotbeam ID from the HTS terminal, and the updating is performed when the spotbeam ID changes.

The method where the HTS terminal includes dual receivers.

The method where the HTS terminal provides an HTS available capacity based on a distance of the mobile terminal from a beam center of a beam transporting the HTS path.

The method where the first path is provided by an HTS terminal, and the tracking includes receiving signaling from the HTS terminal, the updating is performed based on the signaling, and where the signaling includes one or more of a connectivity status, a spot beam ID, an estimated upstream capacity, an estimated downstream capacity, an upstream modulation setting, a forward error-correcting code (FEC) setting, a downstream modulation, a downstream signal strength, or quality.

The method includes using a first tunnel to communicate the packet over the first path and a second tunnel to communicate the packet over the second path, where the updating is performed when a source IP address and a source port of either the first or second tunnel changes.

The method where the first tunnel and the second tunnel each use a Network Address Translation (NAT) traversal friendly protocol.

The method where the updating is performed at an interval.

The method where the tracking includes measuring a one-way latency of the first and second paths to determine the first and second available capacities.

The method where the tracking includes computing a packet loss rate at a receiver for the first and second paths to determine the first and second available capacities.

The method where the tracking includes performing a brief thruput test for the first and second paths to determine the first and second available capacities.

The method where the tracking includes combining measurements, from a sender and a receiver, of the first and second paths to determine the first and second available capacities.

Implementations of the described techniques may include hardware, a method or process, or computer software on a computer-accessible medium. Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Figure 1:
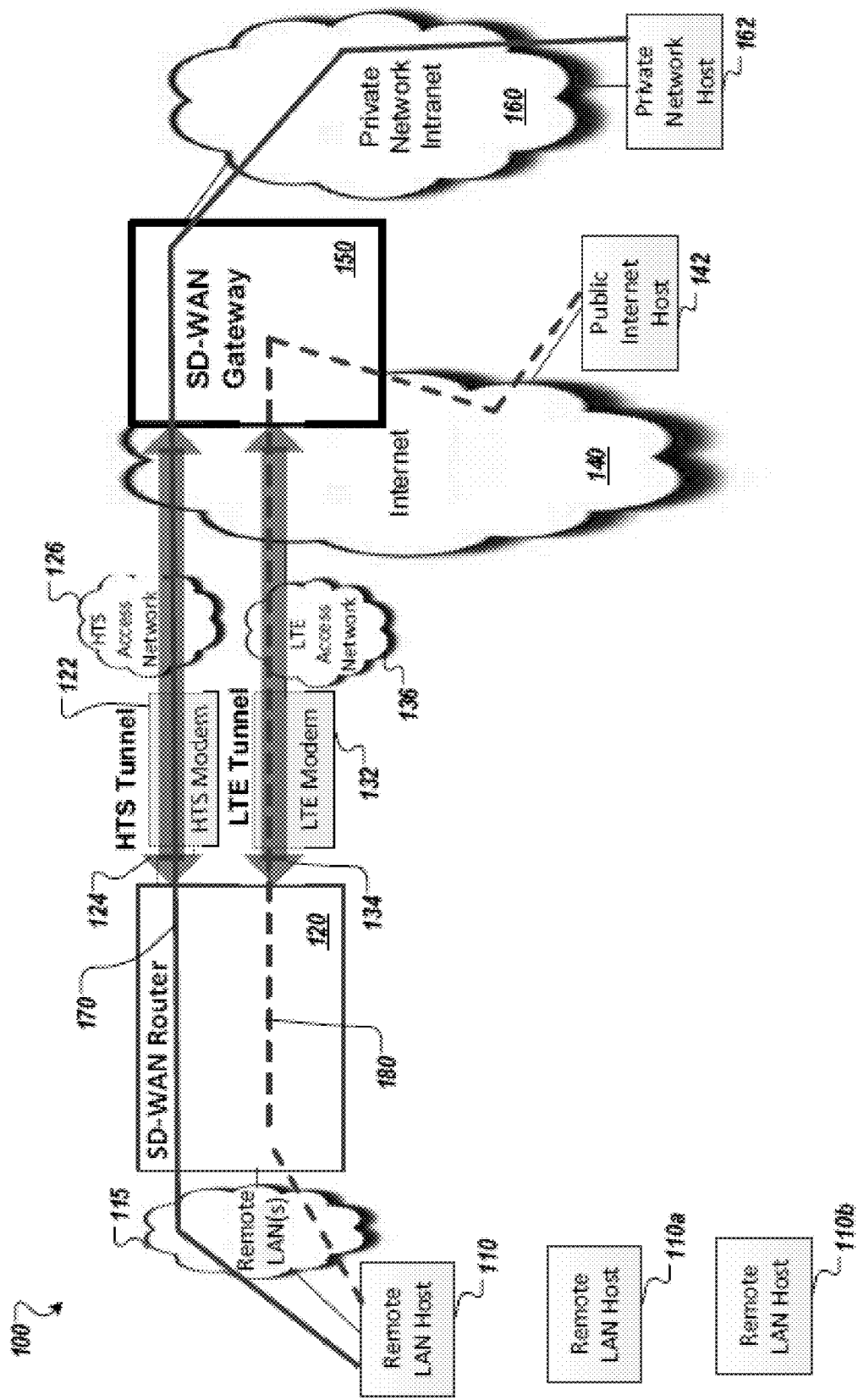
FIG. 1 illustrates an exemplary system providing a high-bandwidth network.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

Introduction

A primary challenge to support mobility applications includes gracefully supporting hand-offs (for example, between beams of an HTS, between cells of a wireless network, between the HTS and the wireless network) and an associated changed transport capacity for a terminal after the handoff. The challenge is further complicated as the transport capacity changes within a cell or spotbeam as the terminal transits thru the beam or cell, for example, transport capacity typically is greater at a cell or spotbeam center than its edge.

The present teachings disclose an accelerator connected to a peer accelerator to provide a network including multiple WANs connections including a WAN connection over an HTS. Unless specifically noted otherwise, a peer accelerator may have the same capabilities as an accelerator. The accelerators track the performance and connectivity, including upstream and downstream capacity, of each of the WAN connections and perform path selection for upstream individual packets based on policies that incorporate the relative loading of those WAN connections. In some embodiments, a mobile satellite terminal connected to a tracking antenna provides the WAN connection over the HTS. The mobile satellite terminal may be a dual-receiver mobile satellite terminal to minimize satellite outage when handing off between satellite spotbeams.

The accelerator tracks the connectivity and performance of the upstream and downstream connections. In some embodiments, a capacity of the upstream and downstream connections may be estimated. The tracking may use excessive latency as evidence of a congested path. The tracking may use packet loss or changes in packet-loss as evidence of a congested path. The tracking may use signaling information from the WAN transport modem to provide either an initial estimate of an available capacity or an on-going estimate of available capacity. The tracking may use brief thruput tests including when entering a new spot-beam or cell.

The accelerator may classify individual IP flows where the classification changes over the lifetime of an IP flow and apply a WAN selection policy for the classification. The path selection for an individual flow may depend on the status of the path and the estimated latency of the path. The estimated latency may be based on a combination of one or more of recent latency measurements, the backlog of traffic waiting to be transmitted across the path and the path's estimated capacity.

The present teachings provide persistence of continuity of end-user TCP and other traffic across an HTS Spotbeam handoff. A setting and adjusting of rate limiters to support the provision of a Quality Of Service (QOS) overlay to non-QOS WAN transports may be provided. The determination of estimations of available capacity upstream and downstream across for each WAN transport may use excessive latency and/or packet loss as evidence of a congested path. Signaling information from the WAN transport modem may provide an initial or an on-going estimate of available capacity. In some embodiments, a brief thruput test may establish an initial estimate of available capacity when entering a new spot-beam or cell.

The present teachings provide continuity of TCP connections using a Performance Enhancing Proxy (PEP) as described in RFC3135 across a single WAN transport outage. Operability with a Wireless WAN transport providing built-in quality of service may be provided. A dual-receiver satellite terminal may be used to provide near-hitless handoff between HTS spotbeams.

According to various embodiments, a terminal may be disposed in an airplane, a ship, a boat, a train, a truck, a car, a troop-carrier or other vehicle.

System Architecture

FIG. 1 illustrates a system-level block diagram of an embodiment.

A HTS Modem is a Mobile HTS Terminal with directional antenna and a wireless modem (or wireless terminal) to transport a wireless tunnel traffic. The wireless modem may be a cellular modem. The present disclosure may refer to a wireless modem and wireless tunnel as an LTE Modem and LTE Tunnel, respectively.

FIG. 1 illustrates an exemplary block diagram of a system 100 of an SD-WAN setup providing QoS Internet or private network access to a site using mobile HTS and mobile wireless connections to the public Internet (referred to in this document as network transports or WAN transports). While the example of FIG. 1 and other examples herein involve two specific network transports, e.g., HTS and wireless, other physical network access technologies or network transports may be used. Any combination of these and other network transports may be used. In some cases, the techniques can be used with multiple instances of the same type of network transport, for example, to provide load balancing among two network connections of the same type (e.g., two different cable Internet connections).

The example of FIG. 1 includes a Remote LAN Host 110 that communicates with a Public Internet Host 142 and a Private Network Host 162. Further details are provided in U.S. Pat. Nos. 10,567,458; 9,680,500; 10,277,716; and 10,708,194 which are hereby incorporated by reference in their entireties. The communication involves transmitting data over two different network transports, a first network transport (e.g., wireless) accessed using a wireless Modem 132 and a second network transport (e.g., HTS) accessed using a Mobile HTS Terminal 122. The use of the two concurrent connections can be transparent to the Remote LAN Host 110, however. The management of the two transports is done by a SD-WAN Router 120 and a SD-WAN Gateway 150 as discussed below. When the Remote LAN Host 110 sends data packets to transmit, the SD-WAN Router 120 evaluates the packets and network conditions to determine which network transport to use (e.g., HTS or wireless) for each packet or group of packets. For example, the SD-WAN Router 120 can classify packets to specify the classes of service (e.g., levels of latency) needed for each packet, and then select the most appropriate of the available network transports given the class of service. The SD-WAN Router 120 then sends each packet to the SD-WAN Gateway 150 using the selected network transport for the packet, and the SD-WAN Gateway 150 sends the packets on to the appropriate network hosts. A similar, complementary process is used to transmit data on the return direction from the SD-WAN Gateway 150 to the SD-WAN Router 120 and back to the Remote LAN Host 110. As a result, the SD-WAN Router 120 and SD-WAN Gateway 150 can concurrently use available network transports to achieve the advantages of each.

Collectively the SD-WAN Router, the HTS Satellite Terminal and the wireless Modem are referred to as a Mobile Terminal (or more simply, the Terminal) herein. Various embodiments include integrating the functionality of the SD-WAN Router, the HTS Terminal and the Wireless Modem into a fewer collection of functional units such as having all three reside within an integrated hardware equipment.

The Remote LAN Host 110 is a host device or endpoint, such as a desktop computer, a laptop computer, a tablet computer, etc., to which the SD-WAN Router 120 and SD-WAN Gateway 150 provide public Internet access (for example to the Public Internet Host 142 via the Internet 140) and/or private network access (for example to a Private Network Host 162 via the Private Network Intranet 160). Typically, there may be multiple such Remote LAN Hosts, all of which can concurrently receive network access through the SD-WAN Router 120 and the Remote LAN(s) 115. For example, remote LAN hosts 110a, 110b can concurrently transmit and receive data through the SD-WAN Router 120 along with the Remote LAN Host 110.

The Mobile HTS Terminal 122 and HTS Access Network provide HTS access to the public Internet. The wireless Modem 132 and the wireless Access Network 136 provide wireless access to the public Internet.

The Remote LAN(s) 115 connect the Remote LAN Host 110 to the SD-WAN Router 120. The SD-WAN Router 120 utilizes multiple of broadband transports to provide Wide-Area-Network (WAN) connectivity to the Remote LAN hosts 110, 110a, 110b. The SD-WAN router 120 has the ability to forward packets to/from the Remote LAN hosts 110, 110a, 110b to/from the SD-WAN Gateway 150 flexibly over either of the at least two broadband transports.

The system 100 uses network tunnelling to connect the SD-WAN router 120 and the SD-WAN Gateway 150. The SD-WAN router 120 and the SD-WAN Gateway 150 can use a different tunnel for each network transport available. A first tunnel, wireless Tunnel 134 is established for packets exchanged over the wireless transport, and a second tunnel, HTS Tunnel 124, is established for packets exchanged over the HTS transport. The HTS Tunnel 124 and the wireless Tunnel 134 represent the ability of the SD-WAN router 120 and the SD-WAN Gateway 150 to forward packets to each other. The HTS Tunnel 124 and the wireless Tunnel 134 may be IPSec tunnels when privacy is required as when Private Network access is required or may be a UDP based tunneling mechanism (e.g., unencrypted) when privacy is not required. Alternatively, they could be some other tunneling mechanism or networking mechanism for relaying packets between the SD-WAN Router 120 and the SD-WAN Gateway 150 over their specific access network. In general, traffic for the HTS Tunnel 124 may be sent exclusively over the HTS transport, and traffic for the WIRELESS tunnel 134 may be sent exclusively over the WIRELESS transport. The HTS Tunnel 124 and the wireless Tunnel 134 may be implemented as different types of tunnels based on a suitability of the tunnel type for a respective broadband transport.

The SD-WAN Gateway 150 terminates the tunnels 124, 134 and has the ability to flexibly forward packets to and from the Remote LAN hosts 110, 110a, 110b over the HTS Tunnel 124 and wireless Tunnel 134 via the SD-WAN Router 120. The SD-WAN Gateway 150 may forward packets to and from a Private Network Intranet 160 and its hosts when Private Network connectivity is being provided. The SD-WAN Gateway 150 may forward packets to and from the Public Internet 140 and its hosts (optionally by performing a Network Address Translation function) when Public Internet Access is provided.

The SD-WAN Router 120 and SD-WAN Gateway 150 together implement SD-WAN policies that provide for identifying and classifying unidirectional IP flows and then selecting which Tunnel (HTS Tunnel 124 or wireless Tunnel 134) or Tunnels may carry a given packet based on the policy and the flow's classification and some combination of the measured performance of the WAN transports and the backlog of packets awaiting transmission across the WAN. Two network connections 170, 180 are shown in the example, but the tunnels 124, 134 can concurrently support transfers for many different connections, including for connections between different LAN hosts.

The system 100 includes a network connection 170 (e.g., a TCP connection), that can include a pair of unidirectional IP flows to connect the Remote LAN Host 110 to the Private Network Host 162 where the SD-WAN policies determine to carry the flow's packets over the HTS Tunnel 124 and thus via the HTS broadband transport.

The system 100 includes a connection 180 (e.g., a TCP connection), which can include a pair of unidirectional IP flows to connect the Remote LAN Host 110 to the Public Network host 142 where the SD-WAN policies determine to carry the flow's packets over the wireless Tunnel 134 and thus via the wireless broadband transport.

The policy's selection of the WAN or WANs to carry an IP flow's packets can shift over time.

In the system 100, the SD-WAN Router 120 and SD-WAN Gateway 150 can classify traffic and assign it to different tunnels 124, 134 at different levels of granularity. For example, the tunnel 124, 134 for traffic can be assigned for a connection 170, 180 as a whole, on an IP flow basis (e.g., for each individual IP flow with a connection being assigned separately), for groups of packets, or for individual packets. After traffic is assigned to a tunnel 124, 134, the SD-WAN Router 120 and SD-WAN Gateway 150 can periodically re-evaluate the assignment. In some cases, the re-evaluation occurs periodically, for example, after a predetermined interval of time or after a predetermined amount of data for the connection or IP flow is received or transmitted. In some implementations, the SD-WAN Router 120 and the SD-WAN Gateway 150 may each evaluate data to be transmitted on an individual packet-by-packet basis or as groups of packets. As a result, as incoming packets of a connection are received, each individual packet or group of packets is newly evaluated in view of current network conditions (including the queue depths of the different tunnels 124, 134) and is assigned to achieve the best overall performance, e.g., lowest latency, lowest cost, or other metric, which can vary based on the class of service indicated by the classification of the packets.

As an example, although the connection 180 is initially assigned to the wireless tunnel 134 as illustrated, network conditions may change, e.g., changing a throughput or latency of one of the network transports, changing a level of congestion on one of the network transports, etc. The transmission queue for the wireless tunnel 134 may increase to the point that the overall expected latency, e.g., the time between adding a packet to the transmission queue and receipt of the packet at the gateway 150, is higher for the wireless transport than for the HTS transport. As a result, some or all of the data for the connection 180 may be assigned to the HTS tunnel 124 for the HTS transport. In this way, data for the connection 180 may be carried on either transport that provides the best latency, or may be carried on (e.g., split across) a combination of multiple transports to achieve the best overall performance.

This technology provides for optimized Public Internet access or optimized Private Network access where two Internet connections are utilized, in this example an HTS connection and an wireless connection, where IP flows are classified (and perhaps dynamically reclassified) so that bulk transfers are carried by the lower-usage cost connection (typically the HTS connection) and so the Interactive Traffic is distributed across the two connections to obtain better responsiveness than is achievable with the HTS alone, and in some cases better than wireless alone, while obtaining lower usage costs than is obtainable by wireless alone.

This technology extends the functionality of an SD-WAN solution with a QoS Overlay which leverages the QoS provided by an HTS Access Network and provides for QoS over the wireless access network. It optimizes Interactive Traffic in several ways. First, the SD-WAN router 120 or gateway 150 can cause a startup handshake packet (or startup set of packets) of an Interactive IP-flow to be carried over wireless with a very high-priority (e.g., very low-latency) class-of-service. Second, the SD-WAN router 120 or gateway 150 can cause a non-startup handshake packet of an Interactive IP-flow to be carried with a high-priority (low-latency) class-of-service, but potentially one which has a lower priority than the startup handshake class of service. This non-startup handshake packet can be sent over the network transport or access network which is estimated to provide lower latency for that packet. The estimation is based on a combination of one or more of the following: (i) the estimated lightly loaded or baseline latency of the access network, (ii) the estimated throughput available to carry packets at this particular class-of-service, and (iii) the total amount of data represented by the packets at that class of service queued up awaiting transmission. In other words, the estimation can take into account the time needed to clear the transmission queue for a specific class of service on a specific network transport to determine the latency most likely to be actually experienced. Third, on the receiving end of the two Tunnels 124, 134, the receiving device (e.g., either the SD-WAN router 120 or gateway 150) can put an IP-flow's packets back in sequence when its packets are carried by multiple tunnels.

The SD-WAN Router 120 and the SD-WAN Gateway 150 can assign bulk transfer IP flows to be carried over the lower-cost transport, at a lower-priority class of service, so as to reduce the impact of the bulk traffic on the latency experienced by the high-priority (e.g., low-latency) classes of service.

This technology includes provisions for monitoring wireless usage against usage limits and for incrementally reducing the fraction of traffic carried via wireless as the usage limits are approached. One technique for reducing that usage is increasingly overestimating the latency that an Interactive Packet may expect from the wireless access network. Another technique is increasing the priority levels carried over the lower-cost transport (e.g., HTS) and adjusting (e.g., typically reducing) the amount of data carried by an IP flow for the higher-cost transport (e.g., wireless) prior to its demotion to such a level. A third technique involves progressively underestimating the capacity of the wireless connection.

In some embodiments, the present teachings may include a TCP Performance Enhancing Proxy functionality. When appropriate, the system may put an IP flow's packets back in sequence when that flow's packets are carried across more than one path or at more than one priority. The system may monitor the status and performance of each WAN connection and factor that status and performance estimation into a packet's path selection. The status may be based on various measurements including latency, packet loss, estimated capacity, jitter, or the like. The system may classify IP flows and set an IP flow's priority based on that classification and factoring the classification and/or priority into a packet's path selection.

The system may adjust the classification of an IP flow over the course of the life of the IP flow so that startup handshake packets (for example the various packets in an HTTPs connection leading up to and including the beginning of the HTTP response header and optional response body) are classified so as to prefer the low-latency wireless WAN connection and to be carried at a higher priority when Quality Of Service is provided. The system may estimate a WAN connection's upstream and downstream capacity. The system may prioritize packet transmission across a WAN connection by means of a rate-limited priority queue where the rate limit is based on estimated WAN connection's capacity thereby providing QOS over a transport connection that otherwise does not provide QOS.

The system may factor a packet's estimated latency across the WAN connections into the packet's path selection where the estimated latency. The packet's estimated latency across a WAN connection may incorporate the estimated or measured uncongested latency of the connection together with the backlog of packets waiting to be transmitted in the WAN connection's priority queue.

Mobility Considerations

A Mobile Terminal may be subjected to a more frequent occurrence of outages on one or more WAN connections due to the signal being physically blocked or interfered with (e.g. tunnels, tall buildings, hills and mountains, etc.). The mobile terminal may be subjected to brief outages occurring when shifting from one spotbeam to another or one wireless cell to another. The mobile terminal may be subjected to variations in performance including capacity when shifting from one spotbeam to another or one wireless cell to another may affect a WAN transport's capacity. The mobile terminal may be subjected to variations in performance including capacity when the terminal moves from the edge to the center of a spotbeam or vice a versa.

Figure 2:
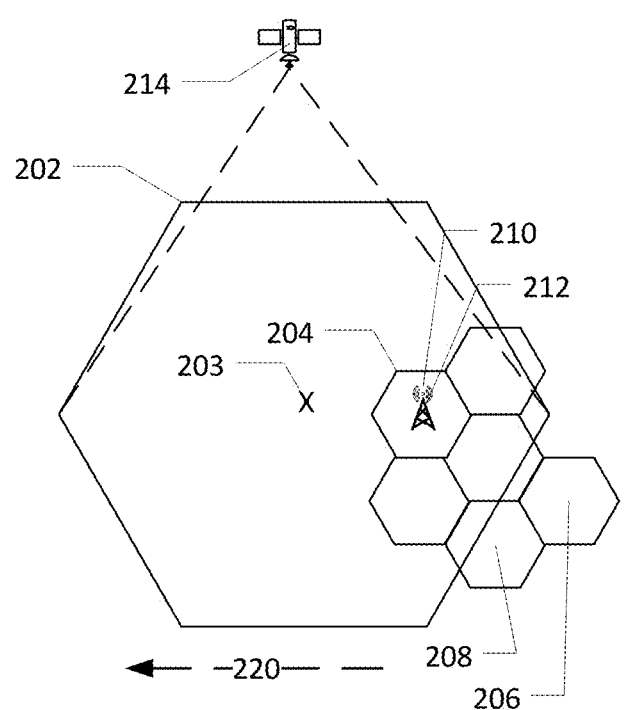
FIG. 2 illustrates an exemplary HTS beam coverage area and wireless cell coverage area, according to various embodiments.

FIG. 2 illustrates exemplary HTS beams and wireless cells, according to various embodiments.

In FIG. 2 wireless cells 204 are the smaller hexagons within a wireless coverage area, while beams 202 are the larger hexagons within a satellite coverage area of a satellite 214. The arrow 220 indicates a direction of travel of a hypothetical mobile terminal (not shown) in FIG. 2. The direction of travel may be used in the present teachings to anticipate available capacities of the wireless and HTS paths.

In FIG. 2 a coverage area of some of the wireless cells 204 is also provided coverage by the beam 202 (for example wireless cell 210), while some of the cells 210 are only partially provided coverage by the beam 202 (for example cell 208). Lastly, in FIG. 2 some of the wireless cells 204 (for example cell 206) are not provided any coverage by the 202. The beam 202 is centered around a beam center 203. Cell 210 is centered around a cell center 212.

Terminal to SD-WAN Router Signaling

In some embodiments signaling from HTS terminal to the SD-WAN router may provide one or more of a connectivity status, spot beam ID, estimated upstream capacity, estimated downstream capacity, upstream modulation and/or forward error-correcting code (FEC) setting, downstream modulation and/or forward error-correcting code (FEC) setting, downstream signal strength or quality, or the like.

With a connectivity Status the SD-WAN router can adjust its path selection to avoid a path with poor or no connectivity. A Spot Beam ID may be used to update estimated HTS upstream and downstream capacity on a Spot Beam change. An estimated upstream capacity may be incorporated into an estimate of HTS upstream capacity to adjust its priority queue's rate limit. An estimated downstream capacity may be incorporated into the SD-WAN Gateway's estimate of HTS downstream capacity to adjust its priority queue's rate limit. An upstream Modulation and/or Forward Error-Correcting Code (FEC) setting may be incorporated into an estimate of HTS upstream capacity to adjust its priority queue's rate limit. A downstream Modulation and/or Forward Error-Correcting Code (FEC) setting may be incorporated into the SD-WAN Gateway's estimate of HTS downstream capacity to adjust its priority queue's rate limit. A downstream Signal Strength Or Quality may be used to adjust the downstream HTS capacity estimate to adjust its priority queue's rate limit.

In some embodiments signaling from the Wireless terminal to the SD-WAN router may provide a connectivity status, cell ID, estimated upstream capacity, estimated downstream capacity, signal strength or quality. A Cell ID may be used to update estimated wireless upstream and downstream capacity on a cell change.

Persistent Connections Across Spotbeam Handovers

Each satellite gateway through which an HTS spotbeam is carried typically performs a Network Address Translation (NAT) operation on the traffic it carries. The result is that typically when a spotbeam handover occurs all operating TCP (and UDP) connections are lost in an ungraceful fashion as the downstream IP address seen by hosts on the public Internet changes as a result of the movement from one spot beam's satellite gateway to the next.

This is overcome by using a NAT-traversal friendly tunneling protocol (e.g. IPSec with NAT traversal) to tunnel packets between the SD-WAN Router and SD-WAN Gateway. The SD-WAN Gateway, when it sees the downstream IP address and port for a HTS tunnel change switches the destination address and port of that tunnel's downstream packets so that as soon as any upstream packet is carried after a spotbeam handover downstream traffic will also be carried by the switch-ed to spot beam.

In some embodiments, the SD-WAN router receives signaling indicating that a handover has occurred and periodically sends a stream of upstream packets until a downstream packet carried by the new spotbeam is received to facilitate the SD-WAN Gateway's switchover of downstream packets to get thru the new spot beam's satellite gateway.

Use of Excessive Latency to Adjust Estimated WAN Capacity

A measured one-way latency may be used to estimate WAN capacity. The SD-WAN router and SD-WAN gateway may send timestamped packets to measure both the upstream and downstream latency. The capacity estimate can be increased when the latency remains close to a baseline value while the connection is carrying traffic at a rate close to the estimated capacity and the estimate can be decreased when the latency rises significantly above the baseline latency. An actual received bit rate concurrent with increased latency can be used as a factor to produce the reduced capacity estimate.

Use of Packet Loss to Adjust Estimated WAN Capacity

In some embodiments, tunneling includes sequence numbers that may be used to compute a packet loss rate at a receiver. By monitoring both packet loss and received thruput across a WAN connection to estimate the WAN connection's capacity. The SD-WAN Router or Gateway presumes that low packet loss indicates that the WAN connection capacity is not overloaded and can adjust its estimate up when the received rate is close to the current estimate. The SD-WAN Router or Gateway can presume that high packet loss together with a relatively high received thruput indicates that the WAN connection is saturated and can adjust down its estimated capacity to the received rate seen during the packet loss. The SD-WAN router can then pass its estimate of capacity based on packet loss to the SD-WAN Gateway to incorporate the SD-WAN router's estimate into its estimate of WAN capacity (for example, based on combination of this and other criteria) to adjust its priority queue's rate limit. Similarly, the SD-WAN Gateway can then pass its estimate of capacity based on packet loss to the SD-WAN router to adjust the rate limit of its priority queue for that SD-WAN router and WAN connection combination.

Use of Signaling to Adjust Estimated WAN Capacity

As described earlier, signaling can be passed from the Mobile HTS Terminal to the SD-WAN Router and from the Wireless modem to the SD-WAN Router. This signaling can be used to help adjust estimated WAN capacity. In some embodiments, the system can use changes in Signal Strength Or Quality to accelerate (or even restart) its estimation of a WAN connection's upstream and/or downstream capacity. In some embodiments, the system can use changes in Spotbeam ID or Cell ID to accelerate (or even restart) its estimation of a WAN connection's upstream and/or downstream capacity. In other embodiments, the system can use the signaled estimated capacity (upstream and/or downstream) either as its estimate of capacity or as a factor in producing its estimate of capacity.

In some embodiments, the system can use a change in the HTS Upstream or Downstream Modulation and/or Forward Error-Correcting Code (FEC) as an input to adjust its estimate of HTS upstream or downstream capacity. For example, a change in the FEC rate encoding could be used to adjust the capacity estimate by the appropriate amount, such as, a shift from a rate ¾ to a rate ½ FEC may reduce the capacity estimate by a ⅓. Similarly, a change in a modulation scheme could be used to adjust the capacity estimate based on the new and previous symbol rates of the respective modulation schemes.

Use of Brief Thruput Tests to Adjust Estimated WAN Capacity

Some embodiments use a brief thruput test where the system forces more traffic than a WAN connection can be expected to carry and uses the resulting stream of packets to estimate the capacity for example by using the measured receive rate as that estimate. The brief testing may lead to significant packet loss. The brief testing may have of about 1 second, 3 seconds, 5 seconds, 10 seconds or the like. In some embodiments the brief thruput test may be performed following an outage and/or after moving from one spotbeam or cell to another.

More on Estimated WAN Capacity

In various embodiments the computation of the estimated capacity is distributed between the SD-WAN Router and SD-WAN Gateway. In some embodiments, the SD-WAN router is responsible for combining measurements it makes along with measurements from the SD-WAN Gateway to arrive at a WAN connection's upstream and downstream estimated capacity and then passing the downstream estimate to the SD-WAN Gateway. In other embodiments the SD-WAN Gateway arrives at a WAN connection's upstream and downstream estimated capacity and passes the upstream estimate to the SD-WAN router. In other embodiments the SD-WAN Gateway arrives at the upstream estimate and sends it to the SD-WAN router and the SD-WAN router arrives at the downstream estimate and passes it to the SD-WAN Gateway.

Operation with a Wireless Network with Built-In QOS

When operating with a Wireless Network with built-in Quality Of Service (QOS), the SD-WAN Router and SD-WAN gateway tag each packet with its desired class of service (COS) for example, using the appropriate DSCP code point for each such class of service. The SD-WAN Router and SD-WAN gateway may measure one-way latency, packet loss rate and rate limited queue for each class of service and thereby estimate a packet's latency based on the estimated thruput and latency of its class of service and the backlog of packets queued for a WAN connection and class of service combination.

In other embodiments, the Wireless Network may not support QOS or a QOS capability may not be used, for example, by sending all packets with a default class of service (such as, a DSCP of 0).

Dual-Receiver Mobile Satellite Terminal Operation

The Mobile Satellite Terminal may include dual receivers to reduce an outage during spot-beam handoff. When the satellite network is a GEO satellite network, only one tracking antenna may be needed for the two receivers. For Non-GEO satellite networks, each receiver may use a separate tracking antenna. A satellite terminal may receive the entire spectrum of the satellite. In a dual receiver embodiment, one satellite receiver can be used for receiving from a current spotbeam (setting spotbeam) and the other satellite receiver may be prepared to receive (acquiring a signal lock) the signal from a next spotbeam (rising spotbeam) as the Mobile Satellite Terminal moves.

TCP PEP Continuity Across WAN Transport

A TCP Performance Enhancing Proxy (PEP) involves terminating the TCP protocol in the SD-WAN Router and SD-WAN Gateway and carrying the proxied TCP traffic across the WAN using a WAN friendly backbone connection. In order to maintain continuity across the frequent brief outages that occur in a mobility setting, the present teachings ensure that, when a WAN that was carrying a PEP'ed TCP connection's traffic suffers an outage (or severely impaired ability to carry packets) that any unacknowledged backbone connection packets are carried via one of the remaining WAN transport's tunnels. This prevents an existing PEP'ed TCP connection from becoming "stuck" during such a single WAN outage.

Figure 3:
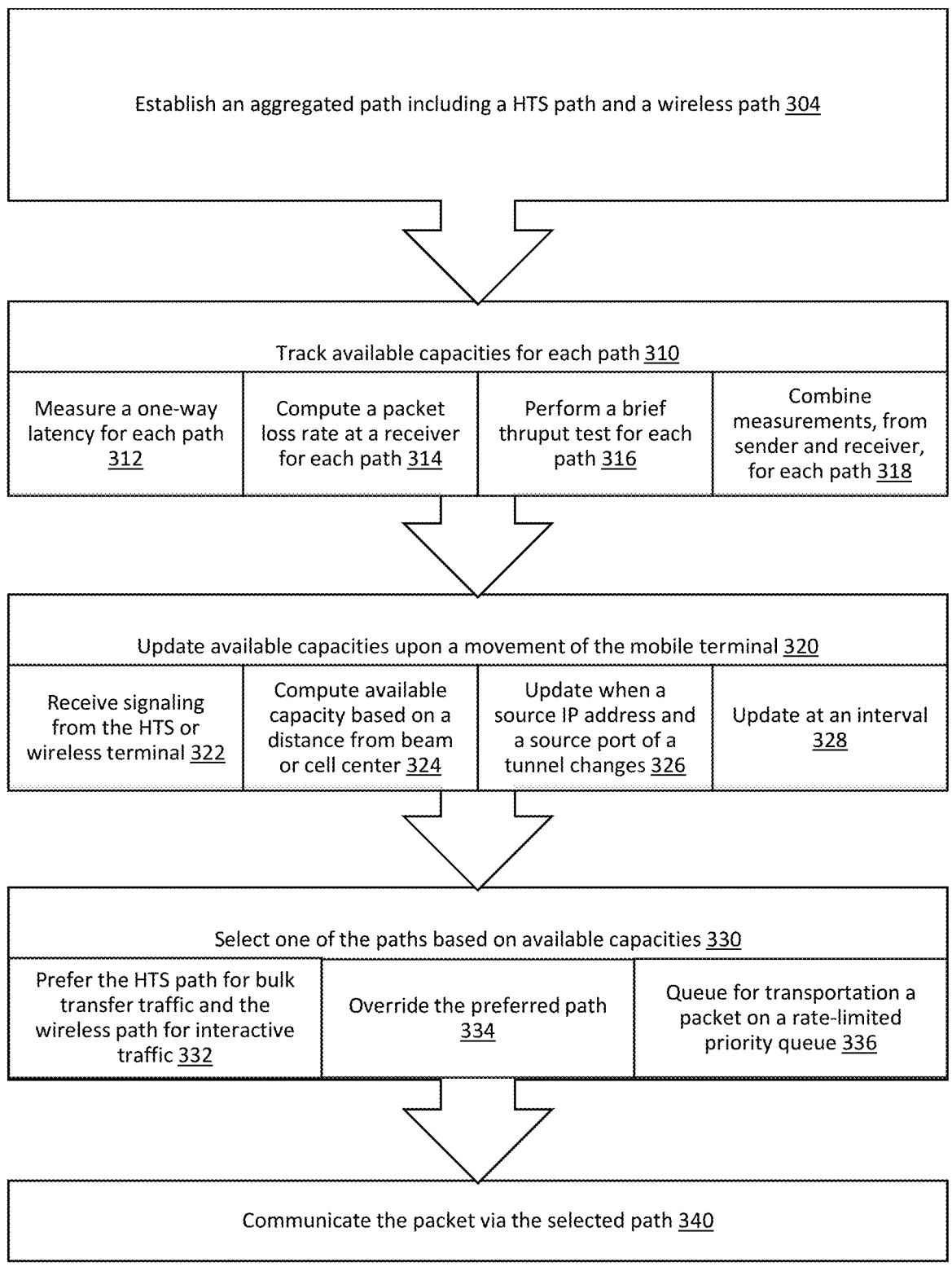
FIG. 3 illustrates an exemplary method for increasing bandwidth utilization of an aggregated path by a mobile terminal, according to various embodiments.

FIG. 3 illustrates an exemplary method for increasing bandwidth utilization of an aggregated path by a mobile terminal, according to various embodiments.

A method 300 for increasing bandwidth utilization of an aggregated path by a mobile terminal may include operation 304 to establish an aggregated path including a HTS path and a wireless path. The method 300 may include operation 310 to track available capacities for each path. The method 300 may include operation 312 to measure a one-way latency for each path. The method 300 may include operation 314 to compute a packet loss rate at a receiver for each path. The method 300 may include operation 316 to perform a brief thruput test for each path. The method 300 may include operation 318 to combine measurements, from sender and receiver, for each path. The method 300 may include operation 320 to update available capacities upon a movement of the mobile terminal. The method 300 may include operation 322 to receive signaling from the HTS or wireless terminal. The method 300 may include operation 324 to compute available capacity based on a distance from beam or cell center. The method 300 may include operation 326 to update when a source IP address and a source port of a tunnel changes. The method 300 may include operation 328 to update at an interval. The method 300 may include operation 330 to select one of the paths based on available capacities. The method 300 may include operation 332 to prefer the HTS path for bulk transfer traffic and the wireless path for interactive traffic. The method 300 may include operation 324 to override the preferred path. The method 300 may include operation 336 to queue for transportation a packet on a rate-limited priority queue. The method 300 may include operation 340 to communicate the packet via the selected path.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

I claim:

1. A non-transient computer-readable storage medium having instructions embodied thereon, the instructions being executable by one or more processors to perform a method for increasing bandwidth utilization of an aggregated path by a mobile terminal, the method comprising:
   establishing the aggregated path of communication with the mobile terminal, wherein the aggregated path comprises a first path comprising a High Throughput Satellite (HTS) path having a first available capacity and a second path comprising a wireless path having a second available capacity;
   tracking the first and second available capacities; and
   updating, upon a movement of the mobile terminal, the first available capacity based on a distance of the mobile terminal from a satellite beam center of a current satellite beam; and
   selecting, to communicate a packet, one of the first and seconds path based on the first and the second available capacities.

2. The method of claim 1, wherein the updating comprises updating the second available capacity based on a second distance of the mobile terminal from a base station of a current wireless signal.

3. The method of claim 1, further comprising communicating the packet via the selected path.

4. The method of claim 3, further comprising queuing for transportation a packet on a rate-limited priority queue, wherein the selecting is based on a backlog on the rate-limited priority queue, and the rate-limited priority queue is selected based on a received thruput measured during an interval with an elevated packet loss.

5. The method of claim 1, further comprising preferring the first path for bulk transfer traffic and the second path for interactive traffic.

6. The method of claim 5, further comprising overriding the preferring, when an available capacity of an unpreferred path is greater than an unpreferred path threshold, wherein the unpreferred path is different than a preferred path.

7. The method of claim 1, wherein an endpoint of the aggregated path is disposed in a mobile platform.

8. The method of claim 1, wherein the second path is provided by a wireless terminal, the tracking comprises receiving a wireless cell ID from the wireless terminal, and the updating is performed when the wireless cell ID changes.

9. The method of claim 8, wherein the wireless terminal provides a wireless available capacity based on a distance of the mobile terminal from a cell center.

10. The method of claim 1, wherein the first path is provided by an HTS terminal, the tracking comprises receiving a spotbeam ID from the HTS terminal, and the updating is performed when the spotbeam ID changes.

11. The method of claim 10, wherein the HTS terminal comprises dual receivers.

12. The method of claim 10, wherein the HTS terminal provides an HTS available capacity based on a distance of the mobile terminal from a beam center of a beam transporting the HTS path.

13. The method of claim 1, wherein the first path is provided by an HTS terminal, and the tracking comprises receiving signaling from the HTS terminal, the updating is performed based on the signaling, and the signaling comprises one or more of a connectivity status, a spot beam ID, an estimated upstream capacity, an estimated downstream capacity, an upstream modulation setting, a forward error-correcting code (FEC) setting, a downstream modulation, a downstream signal strength, or quality.

14. The method of claim 1, further comprising using a first tunnel to communicate the packet over the first path and a second tunnel to communicate the packet over the second path, wherein the updating is performed when a source IP address and a source port of either the first or second tunnel changes.

15. The method of claim 14, wherein the first tunnel and the second tunnel each use a Network Address Translation (NAT) traversal friendly protocol.

16. The method of claim 1, wherein the updating is performed at an interval.

17. The method of claim 1, wherein the tracking comprises measuring a one-way latency of the first and second paths to determine the first and second available capacities.

18. The method of claim 1, wherein the tracking comprises computing a packet loss rate at a receiver for the first and second paths to determine the first and second available capacities.

19. The method of claim 1, wherein the tracking comprises performing a brief thruput test for the first and second paths to determine the first and second available capacities.

20. The method of claim 1, wherein the tracking comprises combining measurements, from a sender and a receiver, of the first and second paths to determine the first and second available capacities.

\* \* \* \* \*